(12) United States Patent
Mathevon et al.

(10) Patent No.: US 7,905,314 B2
(45) Date of Patent: Mar. 15, 2011

(54) PEDESTRIAN DETECTING SYSTEM

(75) Inventors: Vincent Mathevon, Motala (SE); Mark Willerton, Vadstena (SE)

(73) Assignee: Autoliv Development AB, Vargarda (SE)

( * ) Notice: Subject to any disclaimer, the term of this patent is extended or adjusted under 35 U.S.C. 154(b) by 1139 days.

(21) Appl. No.: 10/553,252

(22) PCT Filed: Apr. 8, 2004

(86) PCT No.: PCT/SE2004/000570
§ 371 (c)(1),
(2), (4) Date: Sep. 22, 2006

(87) PCT Pub. No.: WO2004/089704
PCT Pub. Date: Oct. 21, 2004

(65) Prior Publication Data
US 2007/0112513 A1 May 17, 2007

(30) Foreign Application Priority Data
Apr. 9, 2003 (GB) .................................. 0308220.3

(51) Int. Cl.
*B60R 21/34* (2011.01)
(52) U.S. Cl. ........ 180/274; 180/271; 340/435; 340/436; 701/96; 701/301
(58) Field of Classification Search .............. 701/96, 701/301, 1, 45; 180/271, 274; 340/435, 340/436; 382/103, 104
See application file for complete search history.

(56) References Cited

U.S. PATENT DOCUMENTS

| | | | |
|---|---|---|---|
| 3,792,889 A | 2/1974 | Fuener et al. | |
| 4,249,632 A * | 2/1981 | Lucchini et al. | 180/274 |
| 4,518,183 A | 5/1985 | Lee | |
| 4,932,697 A | 6/1990 | Hun | |
| 4,944,540 A | 7/1990 | Mansoor | |
| 4,961,605 A | 10/1990 | Cawthron et al. | |
| 5,033,569 A | 7/1991 | Hayes | |

(Continued)

FOREIGN PATENT DOCUMENTS
DE 197 21 565 A1 5/1997
(Continued)

OTHER PUBLICATIONS

European Patent Office Communication Pursuant to Article 94(3) EPC, Dated Jan. 4, 2008, 5 pages.

(Continued)

*Primary Examiner* — Khoi Tran
*Assistant Examiner* — Stephen Holwerda
(74) *Attorney, Agent, or Firm* — Brinks Hofer Gilson & Lione

(57) ABSTRACT

A pedestrian detection system is provided on a motor vehicle, in order to detect a pedestrian so that an appropriate safety device can be activated in order to provide protection to the pedestrian in the event of an impact with the pedestrian. The detection system has a first sensor arrangement (10) which is located at least 0.5 meters behind the front end of the motor vehicle. The first sensor arrangement (10) is configured to detect the speed of and/or distance to a part of an object (such as a pedestrian) located in front of the vehicle. That part of the object which is detected is part of the object which extends above a predetermined height, which is at least the height of the front edge of the hood or bonnet (3) of the motor vehicle.

21 Claims, 3 Drawing Sheets

U.S. PATENT DOCUMENTS

| | | | |
|---|---|---|---|
| 5,042,858 A | | 8/1991 | Schubert et al. |
| 5,042,859 A | | 8/1991 | Zhang et al. |
| 5,096,242 A | | 3/1992 | Chin-Hun |
| 5,106,137 A | | 4/1992 | Curtis |
| 5,183,288 A | * | 2/1993 | Inada et al. .................. 280/732 |
| 5,285,877 A | | 2/1994 | Bonenberger et al. |
| 5,341,724 A | | 8/1994 | Vatel |
| 5,370,429 A | | 12/1994 | Reuber et al. |
| 5,431,460 A | | 7/1995 | Hass et al. |
| 5,456,142 A | | 10/1995 | Mosher et al. |
| 5,613,418 A | | 3/1997 | Guido |
| 5,618,069 A | | 4/1997 | Konchan et al. |
| 5,646,613 A | | 7/1997 | Cho |
| 5,725,265 A | | 3/1998 | Baber |
| 5,784,943 A | | 7/1998 | Kahra |
| 5,785,368 A | | 7/1998 | Hartmann et al. |
| 5,810,427 A | | 9/1998 | Hartmann et al. |
| 5,853,060 A | | 12/1998 | Chao et al. |
| 5,967,573 A | | 10/1999 | Wang |
| 6,092,845 A | | 7/2000 | Koenig |
| 6,106,033 A | | 8/2000 | Ruckert |
| 6,114,951 A | * | 9/2000 | Kinoshita et al. ............. 340/436 |
| 6,174,008 B1 | | 1/2001 | Kramer et al. |
| 6,217,108 B1 | | 4/2001 | Sasaki |
| 6,224,120 B1 | | 5/2001 | Eipper et al. |
| 6,237,992 B1 | | 5/2001 | Howard |
| 6,257,657 B1 | | 7/2001 | Sasaki |
| 6,293,362 B1 | | 9/2001 | Sasaki et al. |
| 6,312,027 B1 | | 11/2001 | Yang |
| 6,327,536 B1 | | 12/2001 | Tsuji et al. |
| 6,334,639 B1 | | 1/2002 | Vives et al. |
| 6,343,821 B2 | | 2/2002 | Breed |
| 6,390,529 B1 | | 5/2002 | Bingle et al. |
| 6,394,512 B1 | | 5/2002 | Schuster et al. |
| 6,401,565 B1 | | 6/2002 | Wang et al. |
| 6,415,882 B1 | | 7/2002 | Schuster et al. |
| 6,415,883 B1 | * | 7/2002 | Myrholt et al. ................ 180/274 |
| 6,439,330 B1 | | 8/2002 | Paye |
| 6,447,049 B1 | | 9/2002 | Tohda et al. |
| 6,480,103 B1 | | 11/2002 | McCarthy et al. |
| 6,485,081 B1 | | 11/2002 | Bingle et al. |
| 6,513,617 B2 | | 2/2003 | Sasaki et al. |
| 6,516,278 B1 | | 2/2003 | Ishizaki et al. |
| 6,561,301 B1 | | 5/2003 | Hattori et al. |
| 6,571,901 B2 | | 6/2003 | Lee |
| 6,588,526 B1 | | 7/2003 | Polz et al. |
| 6,621,411 B2 | | 9/2003 | McCarthy et al. |
| 6,755,459 B2 | | 6/2004 | Thelen et al. |
| 2002/0014761 A1 | * | 2/2002 | Miyasaka et al. .......... 280/730.1 |
| 2002/0135196 A1 | | 9/2002 | Bingle et al. |
| 2002/0196131 A1 | | 12/2002 | McCarthy et al. |
| 2003/0102688 A1 | | 6/2003 | Bingle et al. |
| 2004/0182629 A1 | * | 9/2004 | Takahashi et al. ............ 180/274 |

FOREIGN PATENT DOCUMENTS

| | | |
|---|---|---|
| DE | 197 10 417 A1 | 9/1998 |
| DE | 199 57 872 A1 | 7/2001 |
| DE | 10141730 A1 | 3/2003 |
| DE | 102 59 428 A1 | 7/2004 |
| EP | 1176062 A2 | 1/2002 |
| GB | 1541976 | 3/1979 |
| GB | 2387 577 A | 10/2003 |
| GB | 2387 578 A | 10/2003 |
| GB | 2387 581 A | 10/2003 |
| JP | 7-125604 | 5/1995 |
| JP | 7-125610 | 5/1995 |
| JP | 7-246908 | 9/1995 |
| JP | 9-30368 | 2/1997 |
| JP | 10-194158 | 7/1998 |
| JP | 11028994 | 2/1999 |
| JP | 11-310095 | 11/1999 |
| JP | 3105391 B2 * | 10/2000 |
| JP | 2001-195698 | 7/2001 |
| JP | 3212841 B2 * | 9/2001 |
| JP | 2002-37017 | 2/2002 |
| JP | 2003-81052 | 3/2003 |
| JP | 2003-104143 | 4/2003 |
| JP | 2003-226211 | 8/2003 |
| WO | WO 96/20852 | 7/1996 |

OTHER PUBLICATIONS

Japanese Patent Office Notification of Reason for Rejection (English Translation), Sep. 7, 2009, Japanese Patent Application No. 2006-508017.

* cited by examiner

ID SYSTEM

CROSS REFERENCE TO RELATED APPLICATIONS

This application claims priority to Great Britain patent application 0308220.3, filed Apr. 9, 2003 and PCT/SE2004/000570, filed Apr. 8, 2004.

FIELD OF THE INVENTION

The present invention relates to a pedestrian detection system, and more particularly relates to a pedestrian detection system for detecting pedestrians in front of a vehicle to enable the deployment of a pedestrian protection safety device mounted on the vehicle.

BACKGROUND AND SUMMARY OF THE INVENTION

Various pedestrian detection systems have been proposed before, mainly incorporating sensors mounted on the front of the vehicle, such as in the bumper or fender of the vehicle. Such detection systems can easily give a false output signal, causing inappropriate deployment of a safety device, for example, when striking an item such as road-cone or an animal.

The present invention seeks to provide an improved pedestrian detection system.

According to the present invention there is provided a pedestrian detection system provided on a motor vehicle, the motor vehicle having a hood or bonnet, the detection system including: a first sensor arrangement located more than about 0.5 meters behind the front end of the vehicle to detect the speed of and/or distance to a part of an object located in front of the vehicle, the part of the object extending above a predetermined height, the predetermined height being at least the height of the front edge of the hood or bonnet; and a second sensor arrangement comprising a sensor mounted in the front bumper or fender of the vehicle responsive to an impact of the vehicle with an object.

Preferably, the first sensor arrangement is a microwave radar.

Advantageously, the first sensor arrangement is an infra-red radar.

Conveniently, the first sensor arrangement is a camera.

Preferably, the camera operates in the visible spectrum.

Advantageously, the camera operates in the infra-red spectrum.

Conveniently, the first sensor arrangement is a stereo-camera arrangement.

Preferably, the first sensor arrangement is mounted on the exterior of the vehicle in front of a windscreen or windshield provided on the vehicle.

Advantageously, the first sensor arrangement is mounted on the vehicle behind the windscreen or windshield of the vehicle.

Conveniently, the first sensor arrangement is mounted above the windscreen.

Preferably, a pedestrian protection arrangement is provided, the detection system being configured to activate the pedestrian arrangement device in response to the first sensor arrangement detecting the distance below a threshold and/or a speed above a threshold.

Conveniently, threshold distance is less than the distance between the sensor and the front of the vehicle.

Preferably, the second sensor arrangement further includes an accelerometer.

Advantageously, the accelerometer is configured to provide a signal indicative of a crash situation and wherein, upon receipt of said signal, an internal safety device on the vehicle is actuated.

Preferably, the sensor mounted in the front bumper is a contact sensor.

Advantageously, the second sensor arrangement is a sensor that can discriminate objects lighter than a pedestrian.

Conveniently, the pedestrian protection arrangement is activated only if the first sensor arrangement detects a distance below a threshold and/or a speed above a threshold, and also the second sensor arrangement detects an object.

Preferably, the pedestrian protection arrangement has at least two modes of activation.

Advantageously, the pedestrian protection arrangement incorporates at least two pedestrian devices.

Conveniently, the pedestrian protection arrangement incorporates a lifter to lift the front part of the hood or bonnet, and a lifter to lift the rear part of the hood or bonnet, one mode of activation being the lifting of the front part of the hood or bonnet, a second mode of operation including additionally the lifting of the rear part of the hood or bonnet.

Preferably, the pedestrian protection arrangement includes a mechanism to lift the rear part of the hood or bonnet, and at least one air-bag to cover part of the windscreen and/or part of A-Pillars provided on the vehicle, one mode of activation comprising the lifting of only the rear part of the hood or bonnet, the second mode including additionally the activation of at least one air-bag.

Advantageously, different modes are activated in response to a signal dependent on the first sensor arrangement reaching different thresholds.

Conveniently, at least one of said different thresholds is dependent upon the vehicle speed as measured by a third sensor arrangement.

BRIEF DESCRIPTION OF THE DRAWINGS

In order that the invention may be more readily understood, and so that further features thereof may be appreciated, the invention will now be described, by way of example, with reference to the accompanying drawings, in which.

DETAILED DESCRIPTION OF THE INVENTION

Figure 1:
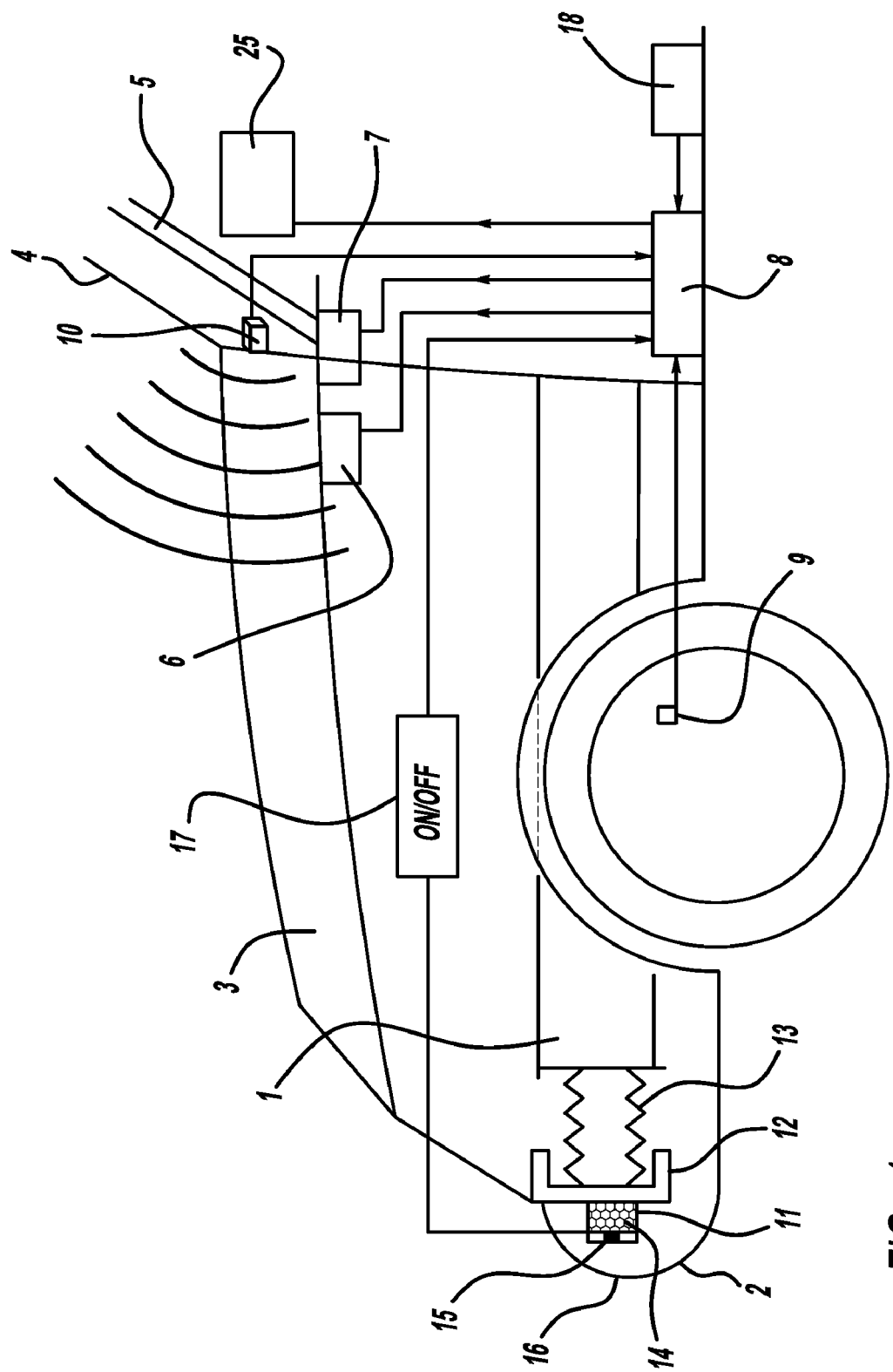
FIG. 1 is a part diagrammatic view illustrating the front part of a motor vehicle provided with a pedestrian detection system in accordance with the invention.

The vehicle of FIG. 1 is provided with a frame or chassis 1, and the front of the vehicle is provided with a bumper or fender 2, and a hood or bonnet 3. The hood or bonnet 3 is, as is conventional, located in front of a windscreen or windshield 4. The windscreen or windshield 4 is provided, on either side, with an A-Post 5. The vehicle is provided with two safety devices configured to provide protection for a pedestrian in the event that the vehicle should strike a pedestrian in an accident.

The first safety device is in the form of a lifter 6 located beneath the rear part of the hood or bonnet 3. The lifter 6 may be actuated to raise the rear part of the hood or bonnet 3 so that a central region of the hood or bonnet 3 is spaced above the underlying engine block. Should the head of a pedestrian strike the raised central region of the hood or bonnet 3, the central region of the hood or bonnet 3 will be deformed downwardly, decelerating the head of the pedestrian in such a way that the risk of injuries arising is minimised.

The second safety device is in the form of an inflatable air-bag unit 7, the air-bag unit being mounted in position adjacent the base of the windscreen 4 and being configured, upon inflation, to extend over the lower part of the windscreen 4, and also part of the A-Post 5. The air-bag 7 will thus minimise the risk of a pedestrian receiving injuries by striking his head or her against the windscreen 4 or A-Post 5.

The air-bag unit 7 may be controlled in such a way as to be inflated at different relative times or with different relative pressures depending upon various parameters related to the accident.

The two safety devices 6 and 7 are controlled by a controller 8 which receives various input signals from sensors provided on the vehicle. The controller 8 may, for example, receive an input from a speed sensor 9, indicating the speed of the vehicle.

The controller 8 may also receive an input from a sensor 10 which is located in position, in the illustrated embodiment, just behind the windscreen 4 at a position above the rear part of the hood or bonnet 3. The sensor 10 is thus located a substantial distance behind the front part of the vehicle, and certainly at a distance of at least 0.5 meters behind the front part of the vehicle. The sensor 10 is a sensor which operates on received radiation and may thus be a camera operative in the visible spectrum or in the infra-red spectrum. The sensor 10 may also be an infra-red radar or a microwave radar detector. The sensor 10 may alternatively be a stereoscopic camera or even two cameras which provide a stereoscopic effect.

Thus the sensor 10 will receive radiation emanating or reflecting from an object, such as a pedestrian, in front of the vehicle. In an alternative embodiment of the vehicle, the sensor 10 may be located just in front of the windscreen on top of the scuttle or rear part of the hood or bonnet 3.

The sensor 10 is adapted to detect the relative speed between the vehicle and an object in front of a vehicle, such as a pedestrian, and may also be adapted to determine the distance of part of an object which is positioned in front of the vehicle, from the vehicle. The sensor 10 may perform one, or preferably both of these functions.

It is to be appreciated that the sensor 10, in the described embodiment, is positioned to detect the relative speed of and/or the distance to part of an object which extends above the height of the front part of the hood or bonnet 3 at the front edge of the hood or bonnet. In this way, the sensor will not respond to a relatively small item such as a traffic cone or a small animal, which will effectively be hidden from the sensor 10 by the front part of the hood or bonnet 3.

The sensor 10 is connected to the control unit 8, and the control unit 8 can be configured to calculate a signal to activate one or both of the pedestrian safety devices 6 and 7 according to the following criteria where the following notations apply:

Speed of impacting vehicle $V_{vehicle}$
Relative speed towards object $V_{rel}$
Distance of object from sensor 10 $D_{sensor}$
Distance from front-end to sensor 10 $D_0$
Distance triggering threshold-level 1 $D_{level\ 1}$
Distance triggering threshold-level 2 $D_{level\ 2}$
Velocity triggering threshold-level 1 $V_{level\ 1}$
Velocity triggering threshold-level 2 $V_{level\ 2}$ When $V_{vehicle}$<vehicle speed limit threshold, no decision can be taken to activate safety devices 6 and 7.

When $V_{vehicle}$>vehicle speed limit threshold, the following conditions apply:
if switch status $S_{status}$ indicates ON (switch to activate system)
then
calculate distance from sensor 10 $D_{sensor} = D_0 - \int(V_{rel})\,dt$ If $D_{sensor} < D_{level\ 1}$ and $V_{rel} > V_{level\ 1}\,(V_{vehicle})$ then the protection systems are activated in a first mode in which only the hood lifter 6 is actuated.

However,
if $D_{sensor} < D_{level\ 2}$ and $V_{rel} > V_{level\ 2}\,(V_{vehicle})$ then the protection systems are activated in a second mode in which both the hood lifter 6 and the air-bag 7 are actuated.

The bumper or fender 2 is provided with another sensor in the form of integral pedestrian sensor 11. The pedestrian sensor 11 is mounted on the front part of a rigid beam 12 which is connected to the chassis 1 by means of a relatively strong, but yieldable mounting 13. Mounted on the front part of the beam 12 is a yieldable element 14 provided on the front face of the bumper, the front part of the yieldable element 14 being provided with a contact sensor 15. The combination of the yieldable element 15 and the contact sensor 15 is provided with an outer covering 16 of foam or the like.

The output of the contact sensor 15 is provided to an on/off enabling circuit 17, the output of which is provided to the control unit 8.

It is to be appreciated that in use of the described pedestrian detection system, should the vehicle strike a pedestrian, the contact sensor 15 will generate an output signal provided to the on/off circuit 17 which will enable or actuate the control unit 8. If the object struck by the vehicle is a relatively small object, the sensor 10 will not sense the presence of the object because the object will be hidden from the sensor 10 by the front part of the hood or bonnet 3, and the pedestrian detection system will provide no further response.

Figure 2:
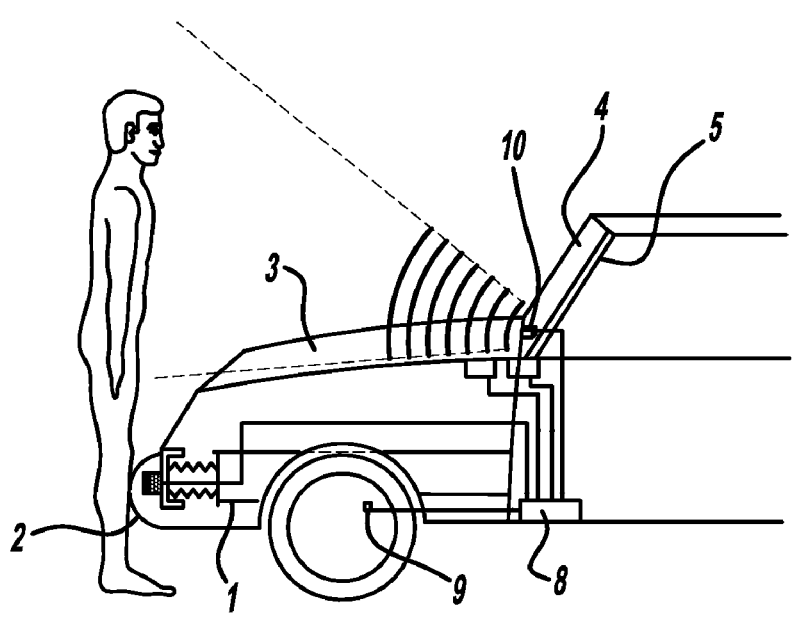
FIG. 2 is a view generally corresponding to FIG. 1 illustrating a vehicle when involved in an accident with a pedestrian.

However, should the vehicle strike a pedestrian located in front of the vehicle, the pedestrian will have a greater height than the height of the hood or bonnet 3 at the front part of the hood or bonnet, and thus the sensor 10 will sense the presence of the pedestrian. The sensor 10 will determine the relative speed between part of the pedestrian and the hood or bonnet 3, or will determine the distance of the pedestrian from the hood or bonnet. The sensor 10 will continue to take such measurements during the following period of time. The initial situation during such an accident is thus generally as shown schematically in FIG. 2.

Figure 3:
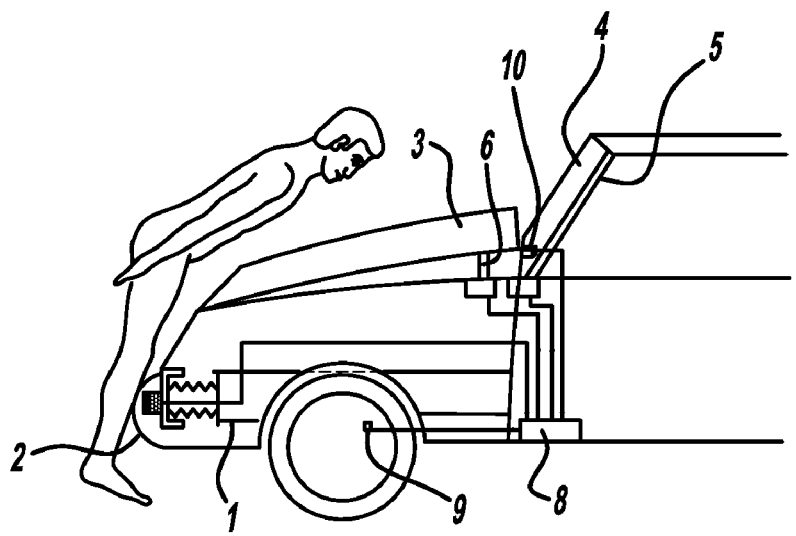
FIG. 3 is a view illustrating the vehicle of FIG. 2 at a subsequent stage during the accident.
Figure 4:
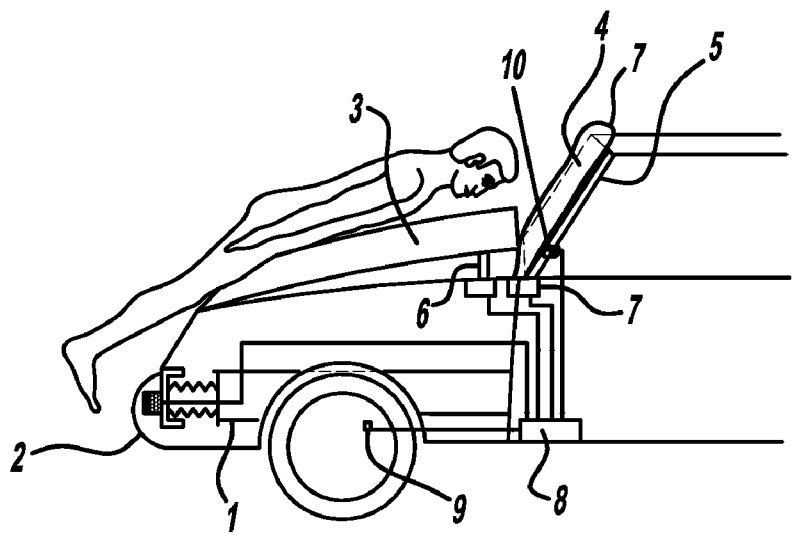
FIG. 4 is a view corresponding to FIG. 3 showing the vehicle at a further subsequent stage during the accident.

The control unit 8 may, if appropriate parameters are met with regard to the speed of the pedestrian relative to the vehicle, the overall speed of the vehicle and/or the distance between the pedestrian and the main part of the vehicle, actuate the bonnet or hood lifter 6 to lift the rear part of the hood or bonnet 3 as shown in FIG. 3. The sensor 10 will also continue to monitor the position of the pedestrian over the following moments of time and, again, if appropriate parameters are met, the air-bag unit 7 may be actuated (as illustrated schematically in FIG. 4) and indeed, depending upon the precise value of certain parameters, may modify or control the moment of deployment of the air-bag 7, adjusting the time of deployment of the air-bag and/or the pressure or quantity of gas supplied to the air-bag.

Whilst FIGS. 1 to 4 illustrate one embodiment of the present invention, it is to be appreciated that many modifications may be effected without departing from the scope of the invention. For example, instead of a single lifter 6 being provided to lift the rear part of the hood or bonnet 3, a lifter may be provided to lift the front part of the hood or bonnet, or, alternatively again, two or more lifters may be provided to lift both the rear part of the hood or bonnet and the front part of the hood or bonnet.

Instead of having a single air-bag 7 to cover the lower part of the windscreen 4 and the A-Post 5, separate air-bags may be provided to cover these parts of the vehicle.

In a preferred embodiment of the invention, the contact sensor 15 provided within the bumper or fender 2 is a force responsive sensor that can discriminate objects having a mass lighter than the mass of a typical pedestrian. In such an arrangement, the on/off circuit 17 will therefore not be actuated unless an object is struck which has a mass equivalent to that of a pedestrian.

To discriminate heavier objects (such as other vehicles) from a pedestrian, a central accelerometer 18 could be provided on the vehicle. In such an arrangement, the generation of a signal from both the accelerometer and the sensor 10, indicates a severe crash situation and so, in such a situation, the control unit 8 could be configured to activate an internal safety device such as an air-bag or seat-belt pretensioner 25 to provide protection to occupants of the vehicle.

Figure 5:
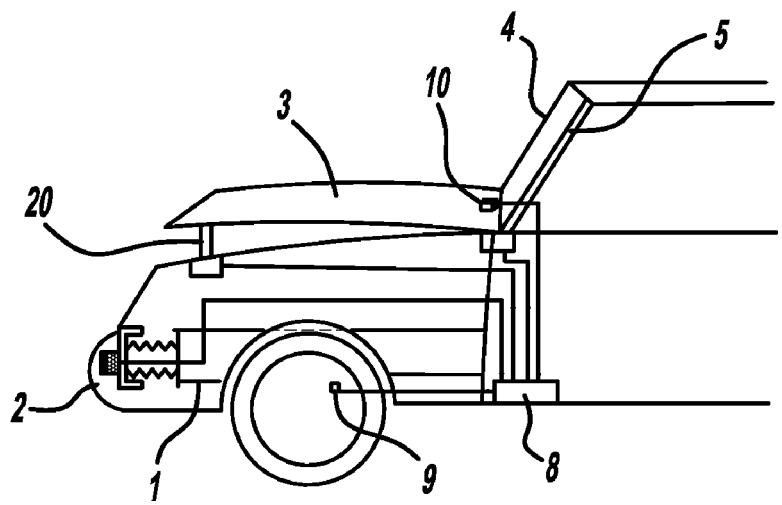
FIG. 5 is a diagrammatic side view of a further vehicle provided with a detection system in accordance with the invention.

FIG. 5 is a diagrammatic view corresponding to FIG. 1 illustrating an embodiment of the invention in which the sensor 10 is mounted on the exterior of the vehicle at the base of the windscreen 4 and in which the hood or bonnet 3 is provided with a lifter 20 at the front of the hood or bonnet.

Figure 6:
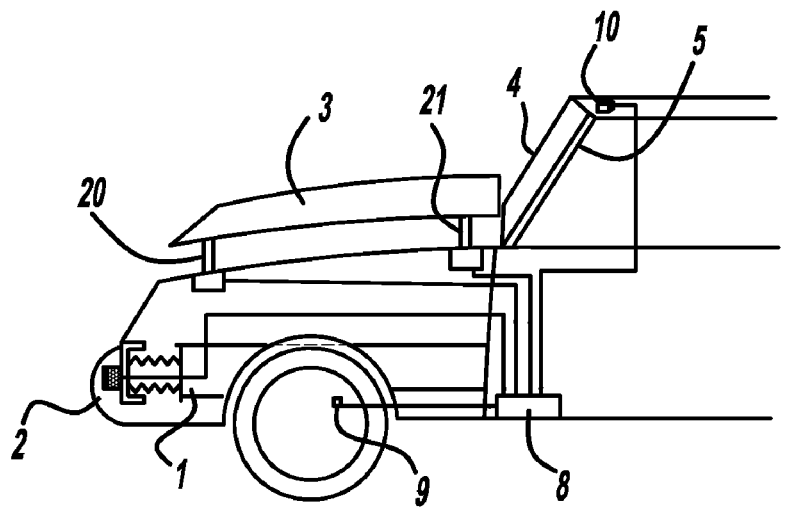
FIG. 6 is a side view of a further vehicle provided with a pedestrian detection system.

FIG. 6 is a view illustrating a further embodiment of the invention in which the vehicle is provided with a lifter 20 at the front of the hood or bonnet, and a further lifter 21 at the rear of the hood or bonnet. In the embodiment shown in FIG. 6 the sensor 10 is mounted on the roof of the vehicle at a position behind the windscreen.

Figure 7:
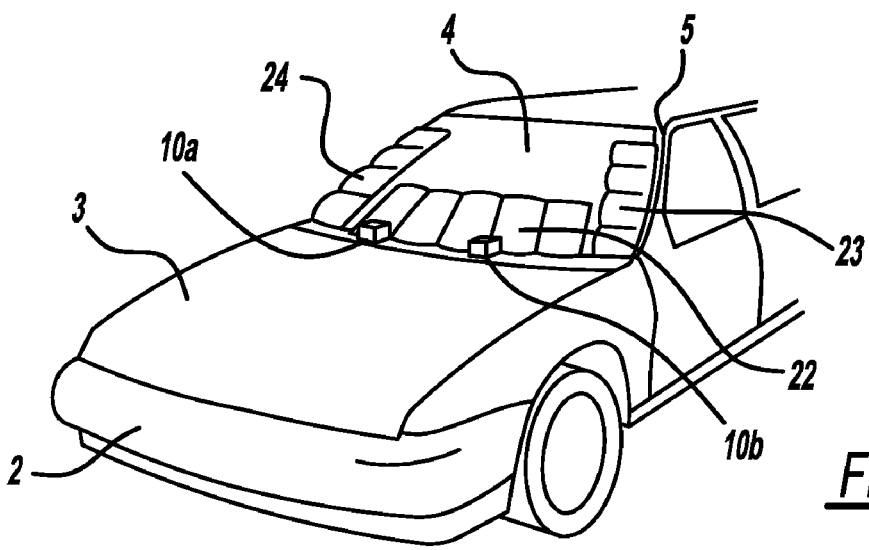
FIG. 7 is a partial perspective view of a further vehicle provided with a pedestrian detector system.

FIG. 7 is a perspective view of a further vehicle in accordance with the invention illustrating the sensor 10 of the previous embodiment replaced within a pair of spaced-apart stereoscopic cameras 10a, 10b mounted on the exterior of the vehicle adjacent the base of the windscreen 4. FIG. 7 also illustrates a first air-bag 22 which, when inflated, covers the lower part of the central region of the windscreen or windshield 4, and two separate air-bags 23 and 24 each of which, when inflated, covers a respective body post, such as the A-Post 5.

It is thus to be appreciated that the pedestrian detection system of the present invention may selectively control a number of different types of safety devices to provide protection for a pedestrian. The safety devices may be deployed simultaneously or sequentially.

While the above description constitutes the preferred embodiment of the present invention, it will be appreciated that the invention is susceptible to modification, variation and change without departing from the proper scope and fair meaning of the accompanying claims.

The invention claimed is:

1. A pedestrian detection system for a motor vehicle having a hood generally extending from the front of the vehicle to a windshield of the vehicle, the detection system comprising: a first sensor arrangement located more than 0.5 meters behind the front of the vehicle to detect at least one of the speed and the distance to a part of an object located in front of the vehicle, the part of the object extending above a predetermined height, the predetermined height being at least the height of a front edge of the hood; and a second sensor arrangement mounted at the front of the vehicle responsive to an impact of the vehicle with the object, the detection system is cooperatively configured with a pedestrian protection arrangement to activate the pedestrian protection arrangement in response to the first sensor arrangement detecting at least one of a distance below a threshold distance and a speed above a threshold speed, wherein the pedestrian protection arrangement has at least two modes of activation.

2. A system according to claim 1 wherein the first sensor arrangement is a microwave radar sensor.

3. A system according to claim 1 wherein the first sensor arrangement is an infra-red radar sensor.

4. A system according to claim 1 wherein the first sensor arrangement is a camera.

5. A system according to claim 4 wherein the camera operates in the visible spectrum.

6. A system according to claim 4 wherein the camera operates in the infra-red spectrum.

7. A system according to claim 1 wherein the first sensor arrangement is a stereo-camera arrangement.

8. A system according to claim 1 wherein the first sensor arrangement is mounted on the exterior of the vehicle in front of the windshield provided on the vehicle.

9. A system according to claim 1 wherein the first sensor arrangement is mounted on the vehicle behind the windshield.

10. A system according to claim 1 wherein the first sensor arrangement is mounted above the windshield.

11. A system according to claim 1 wherein the threshold distance is less than the distance between the first sensor arrangement and the front of the vehicle.

12. A system according to any claim 1 wherein the second sensor arrangement includes an accelerometer.

13. A system according to claim 12 wherein the accelerometer is configured to provide a signal indicative of a crash situation and wherein, upon receipt of the signal, an internal safety device on the vehicle is actuated.

14. A system according to claim 1 wherein the second sensor arrangement includes a contact sensor mounted at the front of the vehicle.

15. A system according to claim 1 wherein the second sensor arrangement is a sensor that can discriminate objects lighter than a pedestrian.

16. A system according to claim 1 wherein the pedestrian protection arrangement is activated only if the first sensor arrangement detects at least one of a distance to the object below the threshold distance and a speed above the threshold speed, and also in the event the second sensor arrangement detects the object.

17. A system according to claim 1 wherein the pedestrian protection arrangement incorporates at least two pedestrian protection devices.

18. A system according to claim 1 wherein the pedestrian protection arrangement incorporates a first lifter to lift a front part of the hood, and a second lifter to lift a rear part of the hood, one mode of activation of the at least two modes of activation being the lifting of the front part of the hood, and another mode of activation of the at least two modes of activation including additionally the lifting of a rear part of the hood.

19. A system according to claim 1 wherein the pedestrian protection arrangement includes a mechanism to lift the rear part of the hood, and at least one air-bag to cover part of the windshield or a portion of an A-Pillar provided on the vehicle, one mode of activation of the at least two modes of activation comprising the lifting of only the rear part of the hood, and another mode of activation of the at least two modes of activation including additionally the activation of at least one of the air-bags.

20. A system according to claim 1 wherein different modes are activated in response to a signal dependent on the first sensor arrangement reaching different thresholds.

21. A system according to claim 20 wherein at least one of the different thresholds is dependent upon the speed of the vehicle as measured by a third sensor arrangement.

\* \* \* \* \*